(12) United States Patent
Hotta et al.

(10) Patent No.: US 10,693,174 B2
(45) Date of Patent: Jun. 23, 2020

(54) FUEL CELL STACK AND METHOD OF PRODUCING THE SAME

(71) Applicant: MORIMURA SOFC TECHNOLOGY CO., LTD., Komaki-shi, Aichi (JP)

(72) Inventors: Nobuyuki Hotta, Konan (JP); Tetsuya Morikawa, Ichinomiya (JP); Hayato Katsuda, Komaki (JP); Hiroshi Sumi, Ichinomiya (JP)

(73) Assignee: MORIMURA SOFC TECHNOLOGY CO., LTD., Komaki-shi, Aichi (JP)

(*) Notice: Subject to any disclaimer, the term of this patent is extended or adjusted under 35 U.S.C. 154(b) by 468 days.

(21) Appl. No.: 14/901,292

(22) PCT Filed: Jun. 27, 2014

(86) PCT No.: PCT/JP2014/067219
§ 371 (c)(1),
(2) Date: Dec. 28, 2015

(87) PCT Pub. No.: WO2014/208739
PCT Pub. Date: Dec. 31, 2014

(65) Prior Publication Data
US 2016/0372778 A1     Dec. 22, 2016

(30) Foreign Application Priority Data

Jun. 28, 2013   (JP) .................................. 2013-136710
Jan. 15, 2014   (JP) .................................. 2014-005312

(51) Int. Cl.
*H01M 8/2483*     (2016.01)
*H01M 8/0282*     (2016.01)
(Continued)

(52) U.S. Cl.
CPC ....... *H01M 8/2483* (2016.02); *H01M 8/0271* (2013.01); *H01M 8/0282* (2013.01);
(Continued)

(58) Field of Classification Search
CPC ............. H01M 8/2483; H01M 8/0271; H01M 8/1246; H01M 8/04201; H01M 8/2432; H01M 8/0282; H01M 2008/1293
See application file for complete search history.

(56) References Cited

U.S. PATENT DOCUMENTS

2003/0096147 A1   5/2003  Badding et al.
2005/0191538 A1   9/2005  Diez
(Continued)

FOREIGN PATENT DOCUMENTS

CA     2 537 513 A1    3/2005
CA     2 724 572 A1   12/2009
(Continued)

OTHER PUBLICATIONS

Search Report dated Sep. 2, 2014, issued by the International Searching Authority in counterpart International Application No. PCT/JP2014/067219 (PCT/ISA/210).
(Continued)

*Primary Examiner* — Ula C Ruddock
*Assistant Examiner* — Matthew W Van Oudenaren
(74) *Attorney, Agent, or Firm* — Sughrue Mion, PLLC

(57) ABSTRACT

A flat-plate-type fuel cell stack including a plurality of plate-shaped stacked fuel cells each including an electrolyte layer, an anode, and a cathode. The fuel cell stack includes at least one of a fuel manifold communicating with a space adjacent to the anode and an oxidant manifold communicating with a space adjacent to the cathode. A compression seal member and a glass seal member are disposed around the at least one manifold.

6 Claims, 14 Drawing Sheets

(51) Int. Cl.
  *H01M 8/04082* (2016.01)
  *H01M 8/1246* (2016.01)
  *H01M 8/2432* (2016.01)
  *H01M 8/0271* (2016.01)
  *H01M 8/124* (2016.01)

(52) U.S. Cl.
  CPC ..... *H01M 8/04201* (2013.01); *H01M 8/1246* (2013.01); *H01M 8/2432* (2016.02); *H01M 2008/1293* (2013.01); *Y02P 70/56* (2015.11)

(56) References Cited

U.S. PATENT DOCUMENTS

| | | | |
|---|---|---|---|
| 2006/0166053 A1 | 7/2006 | Badding et al. | |
| 2006/0188649 A1* | 8/2006 | Qi | H01M 8/0286 427/115 |
| 2009/0311570 A1 | 12/2009 | Chou et al. | |
| 2011/0104586 A1 | 5/2011 | Tucker et al. | |
| 2012/0052410 A1* | 3/2012 | Simpson | H01M 4/881 429/455 |
| 2013/0130137 A1 | 5/2013 | Chung | |
| 2013/0177829 A1 | 7/2013 | Homma | |

FOREIGN PATENT DOCUMENTS

| | | |
|---|---|---|
| CA | 2 897 879 A1 | 7/2014 |
| CN | 1636284 A | 7/2005 |
| CN | 1825672 A | 8/2006 |
| CN | 102067370 A | 5/2011 |
| JP | 10-92450 A | 4/1998 |
| JP | 2002-141083 A | 5/2002 |
| JP | 2005-294153 A | 10/2005 |
| JP | 2006-049195 A | 2/2006 |
| JP | 2009-043550 A | 2/2009 |
| JP | 2012-007727 A | 1/2012 |
| JP | 2012-119164 A | 6/2012 |
| JP | 2012-124020 A | 6/2012 |
| JP | 2013-051128 A | 3/2013 |
| JP | 2013051128 * | 3/2013 |

OTHER PUBLICATIONS

Communication dated Oct. 18, 2016 issued by the Japanese Patent Office in counterpart Japanese Patent Application No. 2014-123710.
Communication dated Feb. 3, 2017, issued the State Intellectual Property Office of People's Republic China in counterpart Chinese Patent Application No. 201480037221.4.
Search Report dated Oct. 14, 2016, issued by the European Patent Office in counterpart European Application No. 14816720.8.
Office Action dated Feb. 20, 2018 by the Canadian Intellectual Property Office in counterpart Canadian Patent Application No. 2,916,417.

* cited by examiner

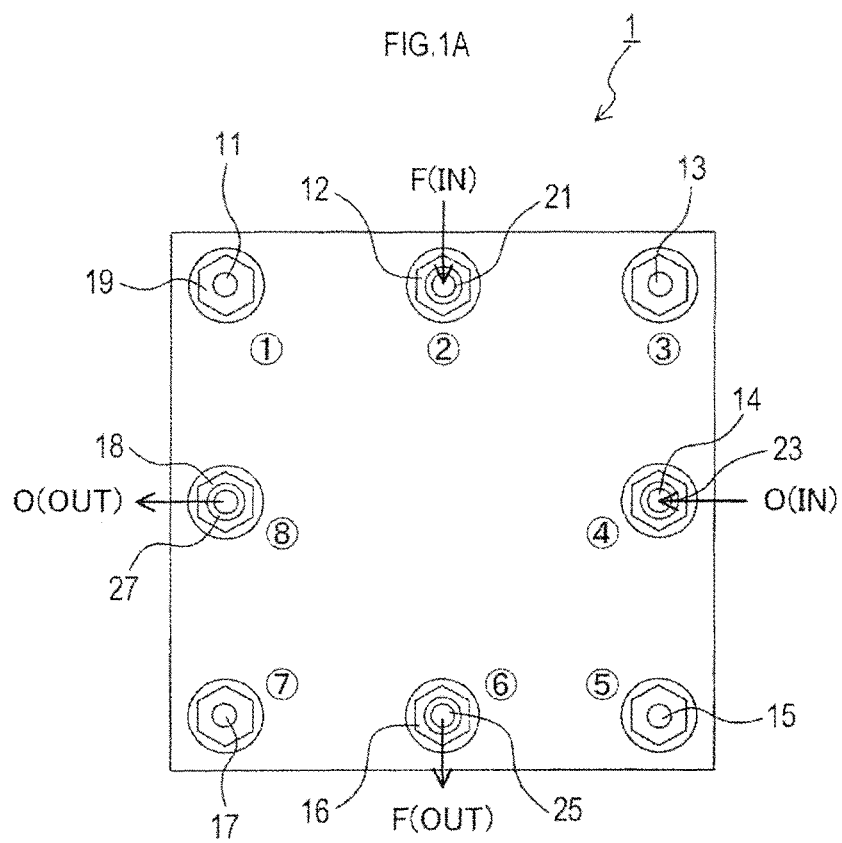
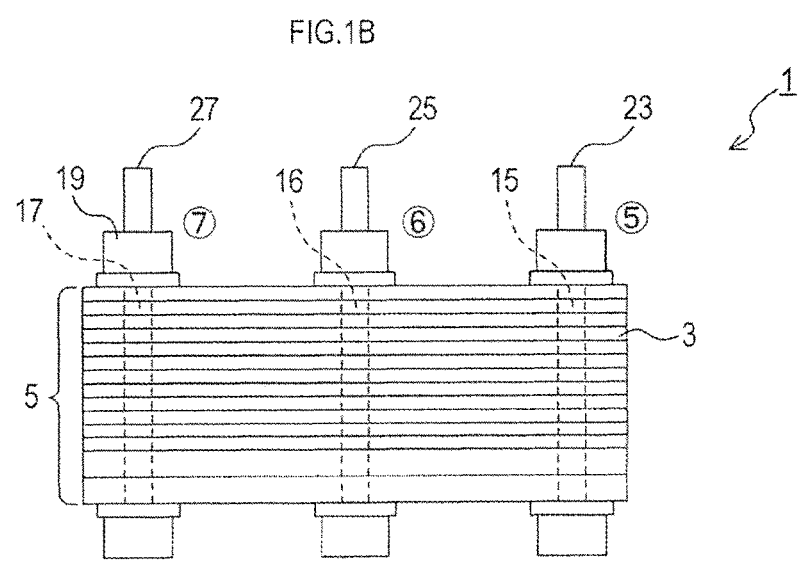

US 10,693,174 B2

FUEL CELL STACK AND METHOD OF PRODUCING THE SAME

CROSS REFERENCE TO RELATED APPLICATIONS

This application is a National Stage of International Application No. PCT/JP2014/067219 filed Jun. 27, 2014, claiming priority based on Japanese Patent Application No. 2013-136710 filed Jun. 28, 2013 and Japanese Patent Application No. 2014-005312 filed Jan. 15, 2014, the contents of all of which are incorporated herein by reference in their entirety.

TECHNICAL FIELD

The present invention relates to gas sealing of a fuel cell stack such as a solid oxide fuel cell stack. The present invention also relates to a fuel cell stack that generates electric power using two types of gases (fuel gas and oxidant gas such as air) which are separately introduced into the fuel cell stack and to a method of producing the fuel cell stack.

BACKGROUND ART

Conventionally, there has been known a solid oxide fuel cell stack in which fuel cells and interconnector plates are alternately stacked to form the fuel cell stack. Each of the fuel cells includes, for example, a flat plate-shaped solid oxide layer (a solid electrolyte layer), an anode disposed on one side of the solid oxide layer and in contact with fuel gas, a cathode disposed on the other side and in contact with oxidant gas, and passages (a fuel passage and an air passage) reaching the anode and the cathode.

Specifically, one known fuel cell used as the above-described fuel cell includes, for example, a single cell including a solid oxide layer with an anode and a cathode provided thereon; a separator joined to the solid oxide layer to separate the fuel gas passage and the oxidant gas passage from each other; an anode frame disposed around the anode; a cathode frame disposed around the cathode; and an interconnector disposed on an outer side of the fuel cell with respect to its thickness direction.

In one known fuel cell stack, manifolds for the fuel gas and manifolds for the air are provided in outer edge portions (frame portions) of the fuel cell stack so as to penetrate the fuel cell stack in its stacking direction, in order to supply the fuel gas and the air to the fuel passages and air passages of the stacked fuel cells and to discharge the (reacted) fuel gas and the air from the fuel passages and air passages of the fuel cells.

In a technique recently developed, each frame-shaped seal member is disposed between adjacent components of a fuel cell stack (e.g., between an interconnector and a separator) so as to surround the outer edge portion of the corresponding single cell and to surround manifolds, in order to prevent gas (particularly, fuel gas) from leaking from, for example, gaps between the stacked single cells of the fuel cell stack.

Techniques proposed to provide gas sealing using such seal members as described above include: a technique that uses compression seal members (which provide sealing under application of pressure) formed of, for example, mica (see Patent Document 1); techniques that use seal members containing glass or glass ceramic (Patent Documents 2 and 3); and a technique that uses ceramic seal members concentrically surrounding manifolds (see Patent Document 4).

PRIOR ART DOCUMENTS

Patent Documents

Patent Document 1: Japanese Patent Application Laid-Open (kokai) No. 2012-124020
Patent Document 2: Japanese Patent Application Laid-Open (kokai) No. 2009-43550
Patent Document 3: Japanese Patent Application Laid-Open (kokai) No. 2002-141083
Patent Document 4: Japanese Patent Application Laid-Open (kokai) No. 2005-294153

SUMMARY OF THE INVENTION

Problems to be Solved by the Invention

However, when compression seal members are used to provide gas sealing, a problem occurs in that it is difficult to completely prevent gas leakage from the interfaces between the compression seal members and interconnectors and from the interfaces between the compression seal members and separators. In addition, gas leakage through the compression seal members themselves may occur. When gas leakage (particularly, leakage of fuel gas) occurs, a problem arises in that the efficiency of power generation is reduced and the leakage gas must be subjected to aftertreatment.

When seal members formed of glass are used, high sealing performance is obtained, but the glass may break when a strong force is applied to the seal members. In addition, in a high temperature environment in which the glass softens, the glass deforms and spreads, and this causes a change in thickness in the stacking direction. In this case, the glass may break during, for example, a subsequent thermal cycle. In addition, for example, electric connection between fuel cells may not be maintained.

When ceramic-made annular seal members are used, the seal members may crack when a strong force is applied thereto, and this may cause gas leakage.

It is desirable to provide a fuel cell stack in which cracking of the seal members can be prevented and gas leakage can be preferably prevented and to provide a method of producing the fuel cell stack.

Means for Solving the Problems (1) A fuel cell stack of a first aspect of the present invention is a flat-plate-type fuel cell stack which comprises a plurality of plate-shaped fuel cells stacked on one another in a stacking direction, each of the plate-shaped fuel cells including an electrolyte layer, an anode disposed on one surface of the electrolyte layer and in contact with fuel gas, and a cathode disposed on the other surface of the electrolyte layer and in contact with oxidant gas, the fuel cells being assembled in a state in which they are pressed in the stacking direction. In the fuel cell stack, at least one of a fuel manifold communicating with a space adjacent to the anode and an oxidant manifold communicating with a space adjacent to the cathode is provided to extend in the stacking direction. Around the at least one manifold of the fuel manifold and the oxidant manifold, the at least one manifold extending in the stacking direction, a compression seal member and a glass seal member are disposed in parallel along a plane in which the corresponding fuel cell extends such that the compression seal member and the glass seal member are sandwiched in the stacking direction between corresponding two of components of the fuel cell stack and surround the at least one manifold.

In the fuel cell stack according to the first aspect of the present invention, around the fuel manifold or the oxidant manifold, a compression seal member and a glass seal member are disposed in parallel along a plane in which the corresponding fuel cell extends (i.e., in an outward direction relative to an axial direction in which the manifold extends: a radial direction) such that the compression seal member and the glass seal member are sandwiched in the stacking direction between corresponding two of components (such as separators, interconnectors, and end plates) of the fuel cell stack, and surround the manifold.

Therefore, the compression seal member and the glass seal member (particularly, the glass seal member adhering to members adjacent thereto) can preferably prevent gas leakage from the manifold or to the manifold through gaps between the components of the fuel cell stack. The term "prevent" not only means "completely prevent" but also means "can reduce the amount of leakage as compared with that in the prior art" (the same applies to the following).

Even when a large force is applied to the fuel cell stack in the stacking direction, the compression seal member can restrain an excessive force from being applied to the glass seal member, so that cracking of the glass seal member can be prevented. Also from this point of view, gas leakage can be preferably prevented.

Even when the glass softens during use in a high-temperature environment, the compression seal member can restrain excessive deformation of the glass seal member. Therefore, its thickness in the stacking direction can be maintained, and cracking of the glass can be suppressed even when the glass is subjected to a thermal cycle. In addition, stable electrical connection can be achieved.

As described above, in the fuel cell stack according to the first aspect, the occurrence of gas leakage (particularly, fuel gas leakage) can be preferably prevented. Therefore, significant effects such as high power generation efficiency and no necessity for aftertreatment of the leakage gas (or easiness of the aftertreatment of the leakage gas) are obtained.

A manifold is a passage of gas (fuel gas or oxidant gas) that extends in the stacking direction and is branched at certain points in the passage.

(2) In a fuel cell stack of a second aspect of the present invention, the glass seal member may have an annular shape and be disposed around the at least one manifold extending in the stacking direction, and the compression seal member may be disposed around an outer circumference of the glass seal member.

The compression seal member may be disposed so as to surround the outer circumference of the glass seal member. This is advantageous in that, even when the glass softens, the glass is less likely to spread around.

(3) In a fuel cell stack of a third aspect of the present invention, the compression seal member may have an annular shape and be disposed around the at least one manifold extending in the stacking direction, and the glass seal member may be disposed around an outer circumference of the compression seal member.

The glass seal member may be disposed so as to surround the outer circumference of the compression seal member. In this case, the area of the glass seal member can be ensured sufficiently, and this is advantageous in that high gas sealing performance by the glass is achieved.

(4) In a fuel cell stack of a fourth aspect of the present invention, the fuel cell stack may be assembled in a state in which it is pressed in the stacking direction as a result of fastening with a bolt.

In this case, the bolt (and a nut screwed onto the bolt) tightens and presses the fuel cell stack to fasten it. This is advantageous in that the fuel cell stack can be easily and reliably fastened.

(5) In a fuel cell stack of a fifth aspect of the present invention, each of the components of the fuel cell stack may be at least one of separators each separating the space adjacent to the anode and the space adjacent to the cathode from each other; interconnectors each serving as a partition between adjacent two of the fuel cells and ensuring electrical continuity between the adjacent two of the fuel cells; and end plates forming end portions, with respect to the stacking direction, of the fuel cell stack.

In the above description, the components of the fuel cell stack are exemplified.

The components of the fuel cell stack include the separators each of which separates the space on the anode side (fuel passage) and the space on the cathode side (air passage) from each other; the interconnectors each of which serves as a partition between adjacent two of the fuel cells, which are constituent units of the fuel cell stack, and ensures electrical continuity between the adjacent two of the fuel cells; and the end plates that form end portions, with respect to the stacking direction, of the fuel cell stack.

(6) In a fuel cell stack of a sixth aspect of the present invention, the compression seal member and the glass seal member may be disposed between one of interconnectors or one of end plates and one of separators, each of the interconnectors serving as a partition between adjacent two of the fuel cells, the end plates being disposed at an end of the fuel cell stack in the stacking direction, and each of the separators being joined to the electrolyte layer of the corresponding fuel cell and separating the space adjacent to the anode of the corresponding fuel cell and the space adjacent to the cathode of the corresponding fuel cell.

In the above description, the locations at which the compression seal member and the glass seal member are disposed are exemplified. In this case, leakage of gas through the gap between an interconnector or an end plate and a separator adjacent thereto can be preferably prevented.

(7) A method of producing a fuel cell stack of a seventh aspect of the present invention is a method of producing the fuel cell stack according to any one of the first through sixth aspect. The method comprises a first step of disposing the compression seal member and a glass material that later becomes the glass seal member on a common plane such that the compression seal member and the glass material are sandwiched in the stacking direction between corresponding two of the components of the fuel cell stack and surround the at least one of the fuel manifold and the oxidant manifold, the at least one manifold extending in the stacking direction; a second step of applying, after the first step, a pressure in the stacking direction of the fuel cell stack to press the compression seal member; and a third step of performing, after the second step, heating at a temperature equal to or higher than a softening point of the glass material and then cooling to form the glass seal member and to join the glass seal member to corresponding two of the components of the fuel cell stack.

In this case, the compression seal member and the glass material that later becomes the glass seal member are disposed on a common plane (of a surface of, for example, a separator or the like) such that the compression seal member and the glass material are sandwiched in the stacking direction between corresponding two of the components of the fuel cell stack and surround the at least one of the fuel manifold and the oxidant manifold, the at least one manifold extending in the stacking direction. Then a pressure is applied in the stacking direction of the fuel cell stack to press the compression seal member. Then heating is performed at a temperature equal to or higher than the softening point of the glass material, and then cooling is performed (i.e., the softened glass material is cooled and solidified). In this manner, the glass seal member is formed, and the formed glass seal member is joined to the components (for example, a separator and an interconnector) of the fuel cell stack.

With this production method, the above-described fuel cell stack can be preferably produced.

Components of the present invention will next be described.

Examples of the fuel cell stack include a solid oxide fuel cell (SOFC) stack.

The compression seal member is a member that deforms when pressed (in the stacking direction) and adheres to components adjacent thereto (in the stacking direction) to thereby form a gas seal. A sheet-shaped member containing, for example, mica, vermiculite, etc. may be used as the compression seal member.

The compression seal member used have gas sealing performance and also has the function as elastic stoppers that are not compressed beyond a certain extent, electrical insulating properties, etc.

A commonly used glass material (e.g., amorphous glass) can be used for the glass seal member. In addition, crystallized glass and partially crystallized glass (semi-crystallized glass) can be used. Various materials such as ceramics may be added in addition to the glass components.

No particular limitation is imposed on the composition of the glass. There can be used a material appropriately selected from well-known materials that soften by heating during production of the fuel cell stack and adhere to components located adjacent thereto in the stacking direction to form a gas seal.

To form the glass seal member, a method including disposing a preform (calcined body) or a sheet-shaped glass material, a method including printing using a glass paste, a method including application of a glass material using a dispenser, etc. can be used.

The glass seal member may be disposed only around the fuel manifold.

When bolts are used as members for pressing the fuel cells in the stacking direction, it is preferable that the thermal expansion coefficient of the bolts is higher than the thermal expansion coefficient of the glass seal member. In this case, the bolts can apply compression stress to the glass seal member during, for example, operation of the fuel cell stack (provided that the glass does not soften), so that the occurrence of cracking of the glass can be reduced (as compared with the case in which tensile stress acts on the glass seal member).

To apply a sufficient compressive force to the glass seal member, it is desirable that part of or the entire glass seal member is disposed directly below a nut (screwed onto the corresponding bolt), i.e., in a projection area onto which the nut is projected in the axial direction of the bolt. Preferably, the glass seal member is present within a range whose size is twice the outer diameter of the nut (twice the radial size of the nut).

The fuel manifold and the air manifold extending in the stacking direction and the bolts inserted thereinto may be disposed such that the bolts are coaxial with the fuel manifold and the air manifold.

BRIEF DESCRIPTION OF THE DRAWINGS

FIGS. 1A-1B FIG. 1A is a plan view of a solid oxide fuel cell stack of embodiment 1, and FIG. 1B is a side view of the solid oxide fuel cell stack.

FIG. 6B is an illustration showing passages of air.

DESCRIPTION OF REFERENCE NUMERALS

Figure 2:
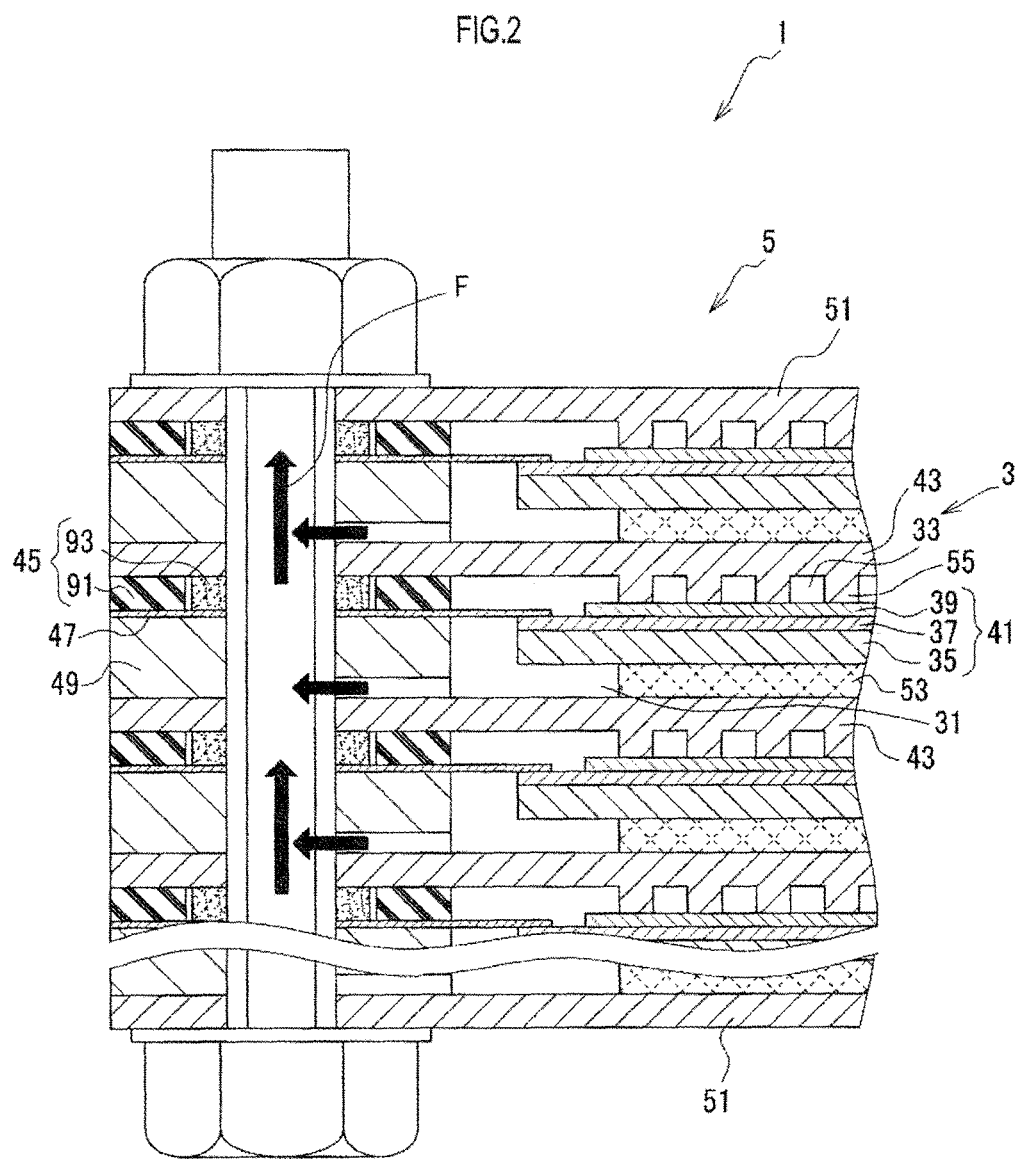
FIG. 2 Illustration showing the solid oxide fuel cell stack cut in its stacking direction.

1: (solid oxide) fuel cell stack
3: fuel cell
5: fuel cell stack assembly
11, 12, 13, 14, 15, 16, 17, 18, 131: bolt
19, 133: nut
35: anode
37: solid oxide layer
39: cathode
41: cell body (single cell)
43: interconnector
45, 101, 121, 137, 143: gas seal section
47: separator
49: anode frame
51, 135, 141: end plate
57: cassette
61, 62, 63, 64, 65, 66, 67, 68: insertion hole
91, 111, 123, 125, 147, 151: compression seal member
93, 103, 105, 107, 109, 127, 149, 153: glass seal member

MODES FOR CARRYING OUT THE INVENTION

Embodiments of a fuel cell stack to which the present invention is applied and a method of producing the fuel cell stack will be described with reference to the drawings. In the following embodiments, a solid oxide fuel cell (SOFC) stack will be described as an example of the fuel cell stack.

Embodiment 1

(a) First, a general configuration of a solid oxide fuel cell stack of embodiment 1 will be described. In the following description, the term "solid oxide" will be omitted.

As shown in FIGS. 1A-1B, the fuel cell stack 1 is a device that generates electric power using fuel gas (e.g., hydrogen) and oxidant gas (e.g., air) supplied to the device.

This fuel cell stack 1 includes a fuel cell stack assembly 5 composed of a plurality of (e.g., 24) stacked flat plate-shaped fuel cells 3 serving as power generation units (power generation cells); a plurality of bolts 11 to 18 penetrating the fuel cell stack assembly 5 in its stacking direction (the vertical direction in FIG. 1B); and respective nuts 19 (they are generally referred to as the nuts 19) screwed onto ends (the upper ends in this case) of the bolts 11 to 18.

The fuel cell stack assembly 5 is composed of a plurality of fuel cells 3 electrically connected in series.

As shown in FIG. 1A, a nut 19 screwed onto the second bolt 12 among the bolts 11 to 18 is provided with a fuel gas introduction tube 21 for supplying fuel gas to the fuel cell stack 1. A nut 19 screwed onto the fourth bolt 14 is provided with an air introduction tube 23 for supplying oxidant gas (hereinafter denoted simply as air) to the fuel cell stack 1, and a nut 19 screwed onto the sixth bolt 16 is provided with a fuel gas discharge tube 25 for discharging from the fuel cell stack 1 a portion of the fuel gas remaining after power generation. A nut 19 screwed onto the eighth bolt 18 is provided with an air discharge tube 27 for discharging from the fuel cell stack 1 a portion of the air remaining after power generation.

Each component will next be described.

As shown in FIG. 2, each of the fuel cells 3 included in the fuel cell stack assembly 5 is a plate-shaped fuel cell 3 of the so-called anode support film type. In each fuel cell 3, a fuel passage 31 through which the fuel gas flows and an air passage 33 through which air flows are separately provided between two; i.e., upper and lower, (electrically conductive) interconnectors 43 and 43.

In each fuel cell 3, a plate-shaped anode 35 is disposed on the fuel passage 31 side, and a solid oxide layer 37, which is a thin film solid electrolyte layer, is formed on a surface (the upper side in FIG. 2) of the anode 35. In addition, a thin film cathode 39 is formed on a surface (the upper side in FIG. 2) of the solid oxide layer 37. The anode 35, the solid oxide layer 37, and the cathode 39 are collectively referred to as a cell body (single cell) 41.

In each fuel cell 3, an anode-side current collector 53 (formed from, for example, a metal mesh and having air permeability) is disposed between the anode 35 and the interconnector 43 on the lower side in FIG. 2. Each interconnector 43 has on its surface (a lower surface in FIG. 2) many block-shaped protrusions formed integrally with the interconnector 43 and serving as a cathode-side current collector 55.

Each fuel cell 3 further includes a sheet-shaped gas seal section 45 disposed on the cathode 39 side; a separator 47 joined to the upper surface of an outer edge portion of the cell body (single cell) 41 (specifically, an outer edge portion of the solid oxide layer 37) to isolate the air passage 33 and the fuel passage 31 from each other; and an anode frame 49 disposed on the fuel passage 31 side. The gas seal section 45, the separator 47, and the anode frame 49 are disposed so as to surround the cell body (single cell) 41 and are stacked and integrated with each other.

Plate members (having electric conductivity, as do the interconnectors 43) at opposite ends, with respect to the stacking direction, of the fuel cell stack 1 are referred to as end plates 51.

The material used for the solid oxide layer 37 may be YSZ, ScSZ, SDC, GDC, a perovskite-type oxide, etc. Ni or a cermet formed from Ni and a ceramic can be used for the anode 35, and a perovskite-type oxide, a noble metal, or a cermet formed from a noble metal and a ceramic can be used for the cathode 39.

Metal plates formed of, for example, ferrite-based stainless steel such as SUS430 or SUS444 can be used for the interconnectors 43, the end plates 51, the separators 47, and the anode frames 49. Metal members formed of, for example, INCONEL (registered trademark) can be used for the bolts 11 to 18 and the nuts 19.

The thermal expansion coefficient of each of the metal plates used may be within the range of 8 to $14 \times 10^{-6}$/K (20 to 300° C.), and the thermal expansion coefficient of the bolts 11 to 18 and nuts 19 used may be, for example, $16 \times 10^{-6}$/K (20 to 300° C.), which is larger than the thermal expansion coefficient of the metal plates.

The components of each fuel cell 3 will be described in more detail.

The fuel cell 3 has a square planar shape, and therefore the components of the fuel cell 3 also have a square planar shape.

Figure 3:
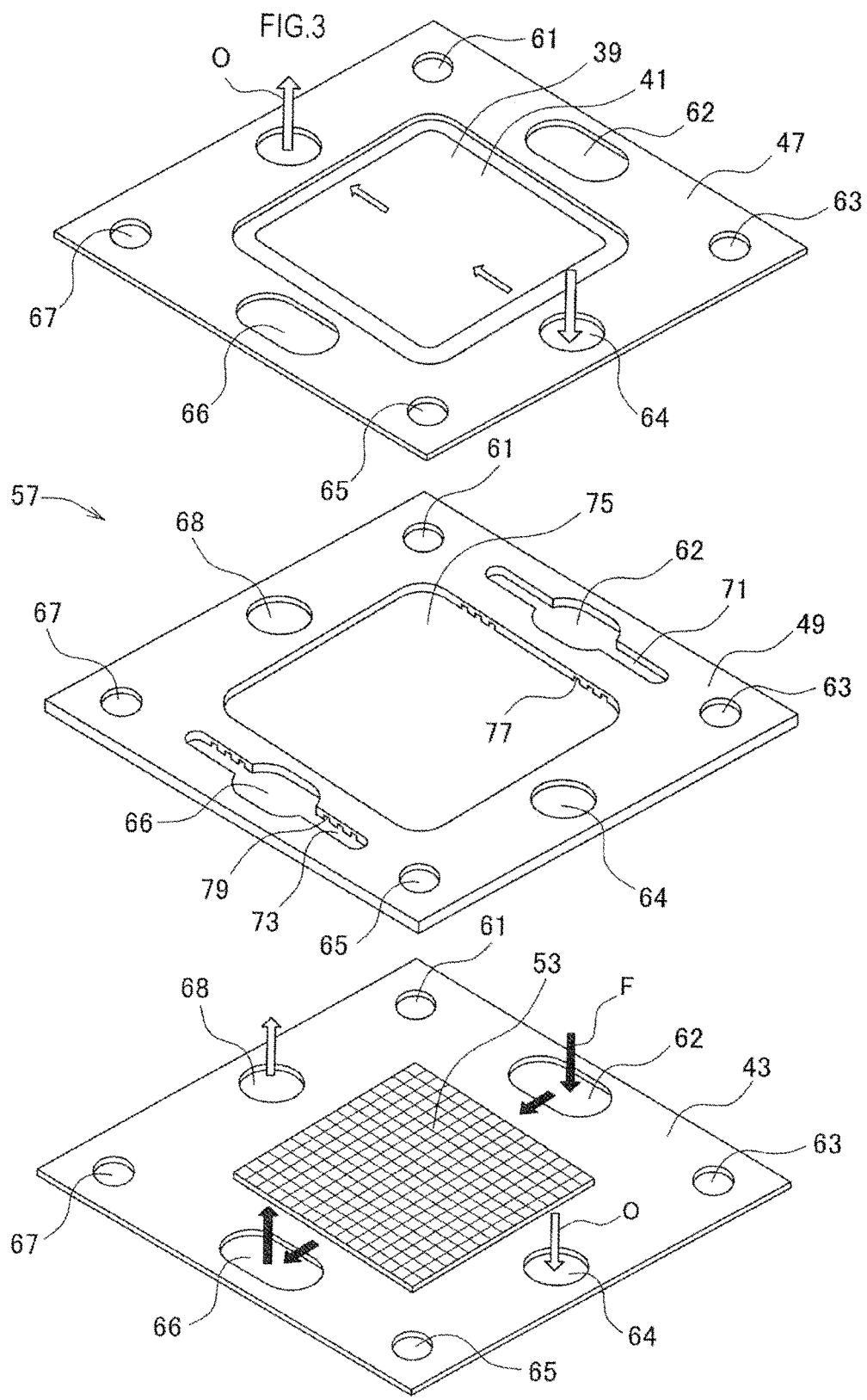
FIG. 3 Exploded perspective view of a cassette of the solid oxide fuel cell stack.

As shown in an exploded view of FIG. 3, an interconnector 43 on which an anode-side current collector 53 is placed, an anode frame 49, and a separator 47 joined to a cell body (single cell) 41 are stacked in the vertical direction in the figure and integrated with each other (by laser welding described later) to form a cassette 57 of the fuel cell stack.

The interconnector 43 is a square plate member, and insertion holes (first to eighth insertion holes) 61 to 68 into which the bolts 11 to 18 are to be inserted are formed in an outer edge portion of the interconnector 43 at substantially regular intervals. Specifically, the insertion holes 61 to 68 (the same insertion holes in different components are denoted by the same numbers) are formed at eight positions corresponding to the four corners of the interconnector 43 and the midpoints of its sides.

Among the insertion holes 61 to 68, the first, third, fifth, and seventh insertion holes 61, 63, 65, and 67 at the four corners are round holes not used as gas passages for the fuel gas and air.

The second and sixth insertion holes 62 and 66 disposed in opposite sides are oval holes having a larger dimension in a direction along the sides. Of these, the second insertion hole 62 is a fuel gas introduction passage (a fuel manifold on a fuel gas introduction side) for introducing the fuel gas into the fuel passage 31 inside the fuel cell 3. The sixth insertion hole 66 is a fuel gas discharge passage (a fuel manifold on a fuel gas discharge side) for discharging the fuel gas from the fuel passage 31 inside the fuel cell 3.

The fourth and eighth insertion holes 64 and 68 disposed in the other opposite sides are round halls. Of these, the fourth insertion hole 64 is an air introduction passage (an air manifold on an air introduction side) for introducing air into the air passage 33 inside the fuel cell 3. The eighth insertion hole 68 is an air discharge passage (an air manifold on an air discharge side) for discharging the air from the air passage 33 inside the fuel cell 3.

The fuel and air manifolds and the bolts 12, 16 and 14, 18 inserted into the fuel and air manifolds are disposed such that the bolts 12, 16 and 14, 18 are coaxial with the corresponding manifolds.

The anode frame 49 is a square frame-shaped plate member, and first to eighth insertion holes 61 to 68 into which the bolts 11 to 18 are to be inserted are formed in an outer edge portion of the anode frame 49.

Of these, the second and sixth insertion holes 62 and 66 have slits (through holes) 71 and 73 extending in their lengthwise direction. The anode frame 49 has a plurality of grooves 77 and 79 (serving as fuel gas passages) that are formed on the side toward the interconnector 43 (the lower side in the figure) so as to allow the slits 71 and 73 to communicate with an opening 75 of the frame.

The separator 47 is a square frame-shaped plate member, and first to eighth insertion holes 61 to 68 into which the bolts 11 to 18 are to be inserted are formed in an outer edge portion of the separator 47.

Figure 4:
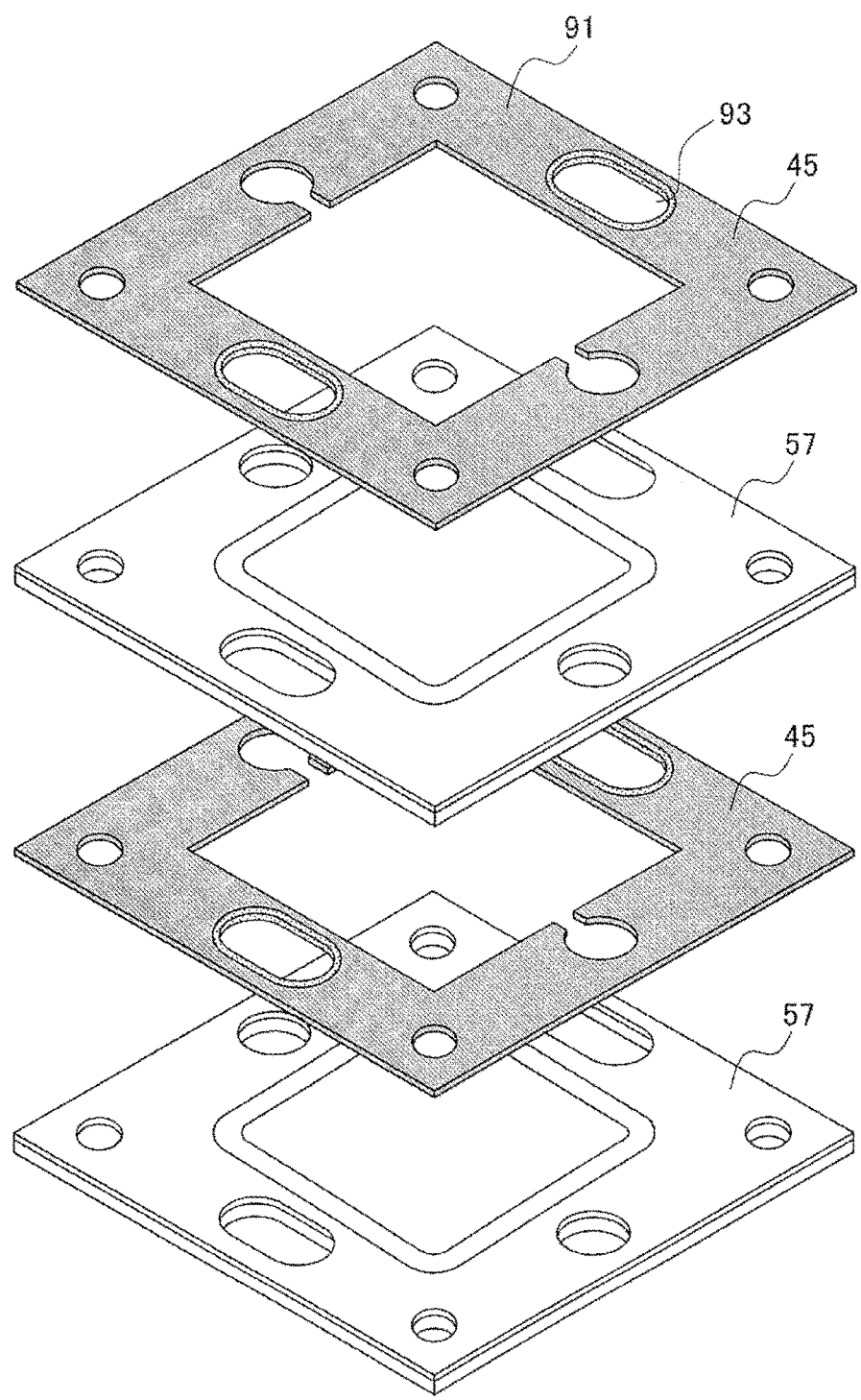
FIG. 4 Exploded perspective view of cassettes and gas seal sections stacked in the solid oxide fuel cell stack.

As shown in FIG. 4, cassettes 57 each having the configuration described above are stacked with sheet-shaped gas seal sections 45 interposed therebetween.

Figure 5:
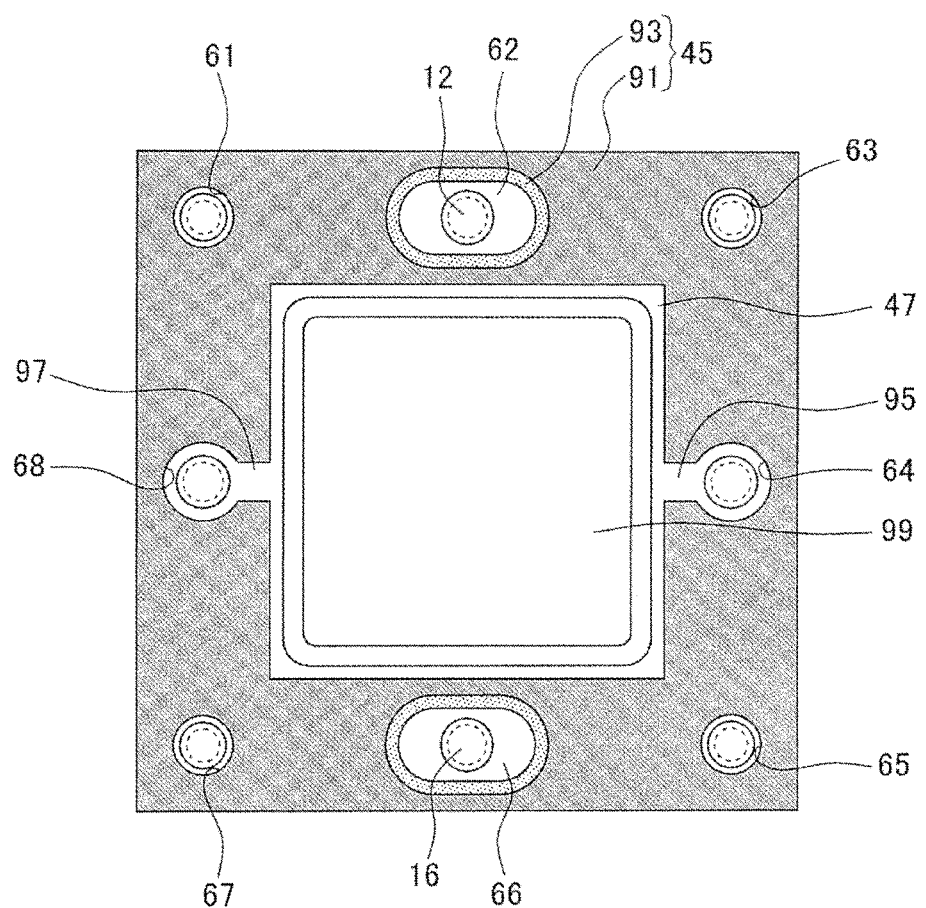
FIG. 5 Plan view showing a gas seal section disposed on a cassette and including a compression seal member and glass seal members.

Particularly, as shown in FIG. 5, each of the gas seal sections 45 in embodiment 1 includes a sheet-shaped compression seal member 91 formed of mica and glass seal members 93 formed of glass. The compression seal member 91 and the glass seal members 93 have electrical insulating properties.

Specifically, around the fuel manifolds extending in the stacking direction of the fuel cells 3 (the thickness direction of the sheet of FIG. 5), the glass seal members 93 and the compression seal member 91 are successively disposed in parallel from the inner side along a plane in which a fuel cell 3 extends (a plane of the sheet) such that the glass seal members 93 and the compression seal member 91 are sandwiched in the staking direction between an interconnector 43 (or an end plate 51) and a separator 47 of the fuel cell stack assembly 5, and surround the fuel manifolds externally (from their outer side).

Specifically, as viewed in the axial direction of the bolts 12 and 16, i.e., in the axial direction of the second and sixth insertion holes 62 and 66 serving as the fuel manifolds, each glass seal member 93 and the compression seal member 91 are disposed concentrically so as to surround the corresponding fuel manifold in radial directions perpendicular to the axial direction (in plan view). In other words, each annular glass seal member 93 is disposed on the inner side, and the compression seal member 91 is disposed so as to surround the entire outer circumference of the glass seal member 93.

More specifically, each compression seal member 91 is a square frame-shaped plate member, and first to eighth insertion holes 61 to 68 into which the bolts 11 to 18 are to be inserted are formed in an outer edge portion of the compression seal member 91. The thickness of the compression seal member 91 is 0.40 mm before assembly and is 0.36 mm after assembly.

The first, third, fifth, and seventh insertion holes 61, 63, 65, and 67 are round holes, and the fourth and eighth insertion holes 64 and 68 are round holes larger in diameter than the first, third, fifth, and seventh insertion holes 61, 63, 65, and 67. The second and sixth insertion holes 62 and 66 are oval holes.

In each compression seal member 91, communication passages 95 and 97 are provided as air passages so as to allow the fourth and eighth insertion holes 64 and 68 to communicate with an opening 99 of the frame.

The annular glass seal members 93 having a thickness of 0.3 mm and a width of 3.0 mm are disposed on the inner circumferential side of the second and sixth insertion holes 62 and 66 of the separator 47 so as to surround the second and sixth insertion holes 62 and 66, as viewed in the stacking direction (the direction perpendicular to the sheet of FIG. 5).

Each of the glass seal members 93 is a gas seal member containing glass (e.g., a gas seal member containing glass as a main component). For example, a commercially available crystallized glass preform (calcined body) can be used, and its softening point is, for example, 770° C.

Desirably, the glass seal members 93 have a thermal expansion coefficient close to the thermal expansion coefficient of metal plates therearound (made of, for example, ferrite-based stainless steel) and, for example, have a thermal expansion coefficient of 8 to $14 \times 10^{-6}$/K (20 to 300° C.) (e.g., $11 \times 10^{-6}$/K (20 to 300° C.)). For example, G018-311 manufactured by SCHOTT can be used.

The operating temperature of the fuel cell stack 1 is, for example, 700° C. However, the temperature in the vicinities of the gas seal sections 45 is about 650° C. Therefore, the glass seal members 93 used have a softening point higher than the temperature of the gas seal sections 45 during operation.

(b) The gas passages in embodiment 1 will be described in brief.

<Fuel Gas Passages>

Figure 6A:
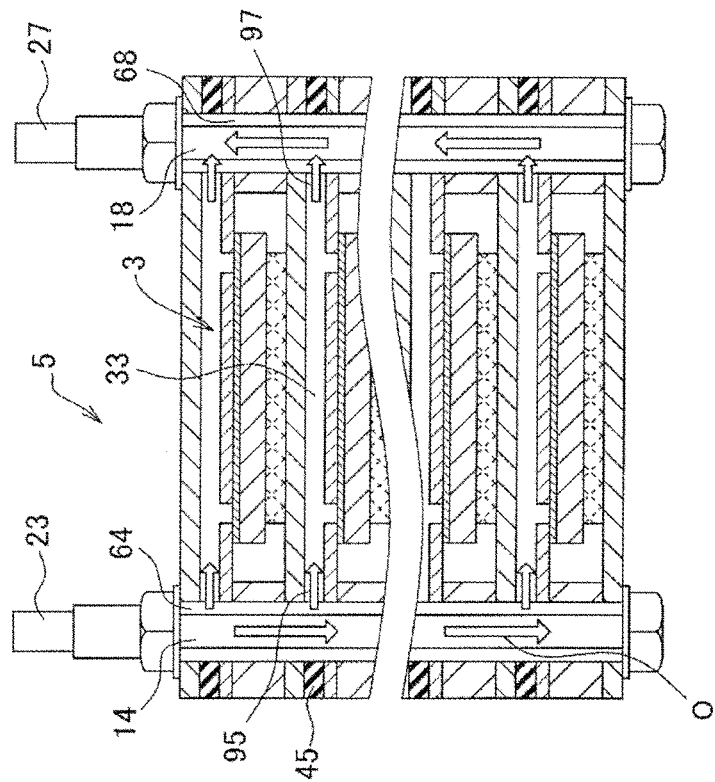
FIGS. 6A-6B FIG. 6A is an illustration showing passages of fuel gas.

As shown in FIG. 6A, the fuel gas introduced into the fuel cell stack assembly 5 from the fuel gas introduction tube 21 is introduced into the second insertion hole 62 (used as the fuel manifold on the introduction side) into which the second bolt 12 is inserted.

An axial groove (not shown) is formed in the forward end (the upper end in the figure) of the second bolt 12, and the space inside the fuel gas introduction tube 21 and the second insertion hole 62 communicate with each other through the groove (the same structure is provided on the fuel gas discharge side, the air introduction side, and the air discharge side).

The fuel gas is introduced into the fuel passages 31 inside the fuel cells 3 from the second insertion hole 62 through the grooves 77 of the anode frames 49 of the fuel cells 3.

Then the remainder of the fuel gas contributing to power generation in the fuel cells 3 is discharged from the fuel gas discharge tube 25 to the outside of the fuel cell stack assembly 5 through the grooves 79 of the anode frames 49 and through the sixth insertion hole 66 (used as the fuel manifold on the discharge side) into which the sixth bolt 16 is inserted.

<Air Passages>

Figure 6B:
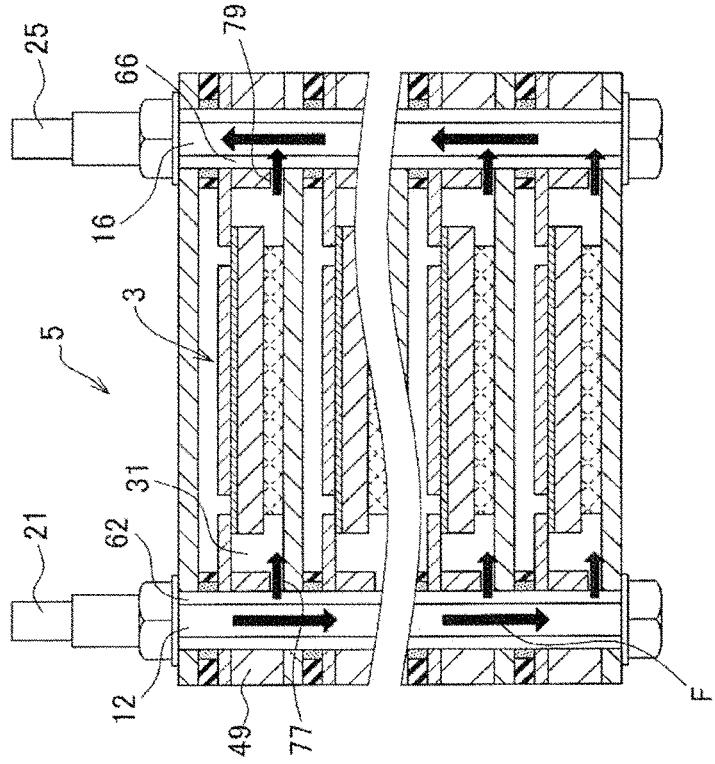

As shown in FIG. 6B, the air introduced into the fuel cell stack assembly 5 from the air introduction tube 23 is introduced into the fourth insertion hole 64 (used as the air manifold on the introduction side) into which the fourth bolt 14 is inserted.

The air is introduced into the air passages 33 inside the fuel cells 3 from the fourth insertion hole 64 through the communication passages 95 of the compression seal members 91 of the fuel cells 3.

Then the remainder of the air contributing to power generation in the fuel cells 3 is discharged from the air discharge tube 27 to the outside of the fuel cell stack assembly 5 through the communication passages 97 of the compression seal members 91 and through the eighth insertion hole 68 (used as the air manifold on the discharge side) into which the eighth bolt 18 is inserted.

(c) A method of producing the fuel cell stack 1 will next be described.

Figure 7A:
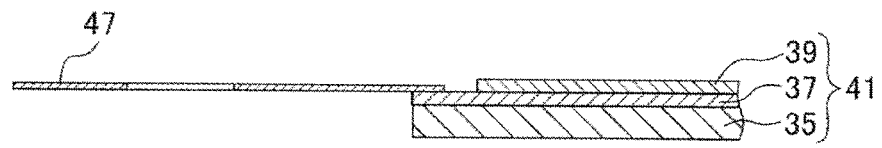
FIGS. 7A-7C Illustrations showing a procedure of producing the solid oxide fuel cell stack.

As shown in FIG. 7A, a (square plate-shaped) cell body (single cell) 41 including an anode 35, a solid oxide layer 37, and a cathode 39 that are integrated together is produced according to a conventional method, and a frame-shaped separator 47 is brazed to an outer edge portion of the cell body (single cell) 41.

Figure 7B:
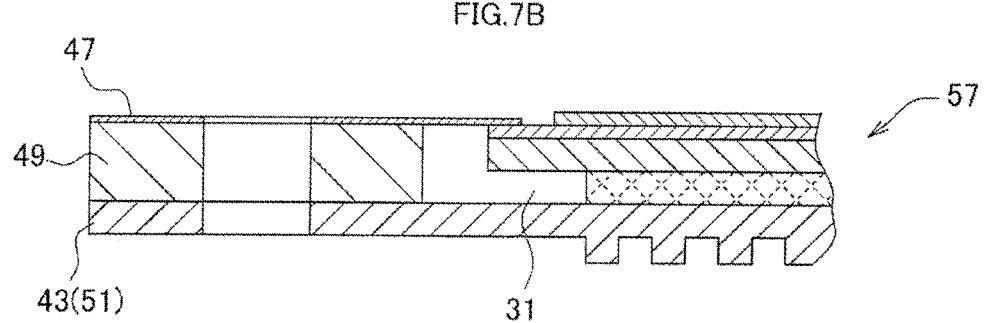

Next, as shown in FIG. 7B, an anode frame 49 is sandwiched between the separator 47 and an interconnector 43 (or an end plate 51), and the anode frame 49, the separator 47, and the interconnector 43 (or the end plate 51) are joined and integrated by laser welding to produce a cassette 57 of the fuel cell stack.

Specifically, these members are laser-welded in annular regions around the second and sixth insertion holes 62 and 66 serving as the fuel manifolds and in annular regions around the fourth and eighth insertion holes 64 and 68 serving as the air manifolds, and the outer edge portion of the separator 47 and the outer edge portion of the interconnector 43 (or the end plate 51) are laser-welded in an annular region.

Therefore, in each cassette 57 of the fuel cell stack, it is possible to completely prevent gas leakage between the inner fuel passage 31 and the fuel manifolds (the second and sixth insertion holes 62 and 66), and the air manifolds (the fourth and eighth insertion holes 64 and 68).

Figure 7C:
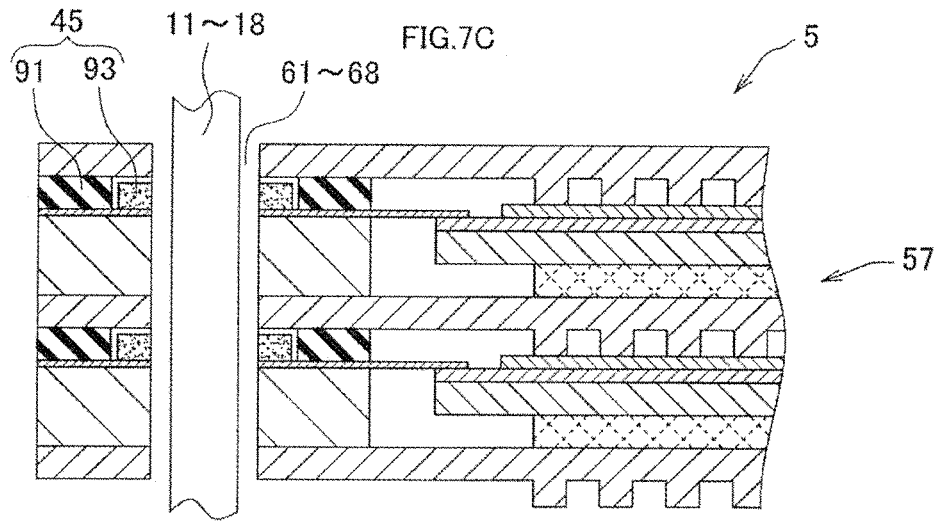

Next, as shown in FIG. 7C, gas seal sections 45 (materials forming the gas seal sections 45) each including a compression seal member 91 and glass seal members 93 (a glass material forming the glass seal members 93) are disposed between adjacent cassettes 57 of the fuel cell stack.

Specifically, as shown in FIG. 5, annular glass seal members 93 (the glass material forming the glass seal members 93) and a compression seal member 91 are disposed on the common plane of the surface of a separator 47 such that the annular glass seal members 93 fully surround the fuel manifolds (the second and sixth insertion holes 62 and 66) and that the compression seal member 91 fully surrounds the glass seal members 93 (the glass material forming the glass seal members 93).

Then, as shown in FIG. 7C, the bolts 11 to 18 are inserted into the insertion holes 61 to 68, and the nuts 19 are tightened onto the bolts 11 to 18 to press the fuel cell stack assembly 5 in its stacking direction (the vertical direction in FIG. 7C), whereby the cassettes of the fuel cell stack assembly 5 are integrated.

Figure 8A:
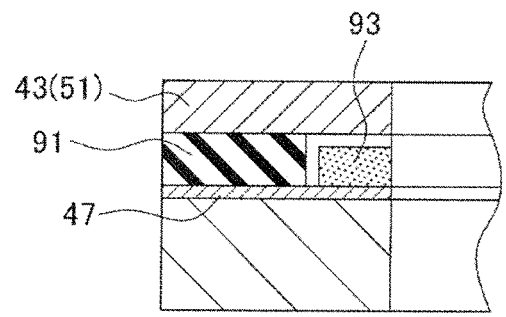
FIGS. 8A-8C Illustrations showing the state of sealing formed by a glass seal member (a procedure of forming a seal).

At this point, as shown in FIG. 8A, the thickness of the compression seal member 91 is 0.36 mm and is larger than the thickness of the glass seal member 93 (before softening), i.e., 0.30 mm, so that a small gap is present between the glass seal member 93 and the interconnector 43 (or the end plate 51).

Figure 8B:
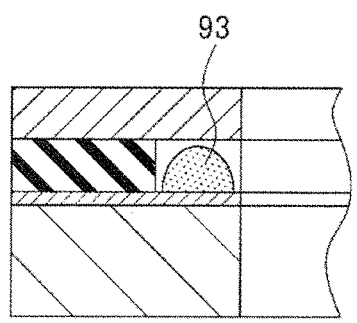

Next, the fuel cell stack assembly 5 (specifically, the glass seal members 93 (the glass material forming the glass seal members 93)) is heated at a temperature equal to or higher than the crystallization temperature of the glass, e.g., 850° C., for 2 hours to crystallize the glass. In the course of heating from the softening point (770° C.) of the glass to its crystallization temperature, each glass seal member 93 softens. The surface tension of the glass causes the glass seal member 93 to have a rounded cross section and assume an upward convex shape as shown in FIG. 8B, and, finally, the glass seal member 93 comes into contact with the upper interconnector 43 (or the upper end plate 51). The fuel cell stack assembly 5 is further heated at 850° C. for 2 hours, and the glass is thereby crystallized.

Figure 8C:
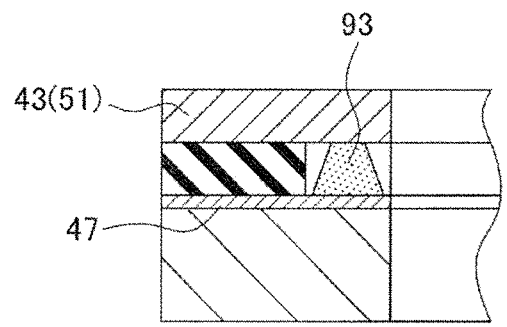

Then the fuel cell stack assembly 5 is cooled, and the glass seal member 93 thereby joins the separator 47 to the interconnector 43 (or the end plate 51) tightly as shown in FIG. 8C.

When the glass is heated, the glass seal members 93 soften. However, as described above, the thermal expansion coefficient of the bolts 11 to 18 is larger than the thermal expansion coefficient of the glass seal members 93 and the thermal expansion coefficient of the metal plates such as the separators 47, the interconnectors 43, and the anode frames 49 that are arranged in the stacking direction. Therefore, when the glass is heated, the fuel cell stack assembly 5 as a whole is loosened (the pressing force of the bolts 11 to 18 decreases but is not zero). Then, when the glass is cooled, the bolts 11 to 18 etc. shrink in the stacking direction (return to their original shape) to form a compressed state, and sealing is thereby achieved with the glass seal members 93 compressed (i.e., the glass forms the sealing).

The gas sealing with the above-described configuration is achieved in the manner described above, and the fuel cell stack 1 is thereby completed.

(d) Effects of embodiment 1 will be described.

In embodiment 1, each of the gas seal sections 45 is disposed around the second and sixth insertion holes 62 and 66 serving as the fuel manifolds and the fourth and eighth insertion holes 64 and 68 serving as the air manifolds so as to surround the manifolds and is sandwiched in the stacking direction between a separator 47 and an interconnector 43 (or an end plate 51).

More specifically, the annular glass seal members 93 are disposed along a plane in which the corresponding fuel cell 3 extends (i.e., in the radial directions of the manifolds) so as to surround the manifolds (for example, in the plan view shown in FIG. 5), and the compression seal members 91 are disposed in the above planes so as to radially surround the glass seal members 93.

Therefore, the compression seal members 91 and the glass seal members 93 (particularly, the glass seal members 93 adhering to members adjacent thereto) can preferably prevent gas leakage from the manifolds or to the manifolds through the gaps between the separators 47 and the interconnectors 43 (and an end plate 51).

Even when a large force is applied in the stacking direction, the compression seal members 91 can restrain an excessive force from being applied to the glass seal members 93, so that cracking of the glass seal members 93 can be prevented. Also from this point of view, gas leakage can be preferably prevented.

Even when the glass softens during use in a high temperature environment, the compression seal members 91 can restrain excessive deformation of the glass seal members 93, so that a reduction in electric connectivity caused by spreading of the glass can be prevented.

As describe above, in embodiment 1, the occurrence of gas leakage of the fuel gas can be preferably prevented, so that significant effects such as high power generation efficiency and no necessity for aftertreatment of the leakage gas (or easiness of the aftertreatment of the leakage gas) are obtained.

In embodiment 1, the bolts 11 to 18 and the nuts 19 tighten, press, and fasten the fuel cell stack assembly 5. This is advantageous in that the fuel cell stack assembly 5 is easily fastened and can be reliably fastened.

The temperature of the fuel cell stack 1 varies according to the operating state of the fuel cell stack 1, i.e., whether the fuel cell stack 1 is operated or not (ON or OFF). However, in embodiment 1, the above-described configuration (the relations among the thermal expansion coefficients of components) allows the glass seal members 93 etc. to be always pressed even when the temperature changes. This is also advantageous in that gas leakage can be prevented.

Embodiment 2

Embodiment 2 will next be described, but description of the same details as those in embodiment 1 will be omitted.

The difference between embodiment 2 and embodiment 1 is the configuration of the gas seal sections in the fuel cell stack, and therefore a description will be given of the gas seal sections. The other components are denoted by the same numerals as those in embodiment 1.

Figure 9:
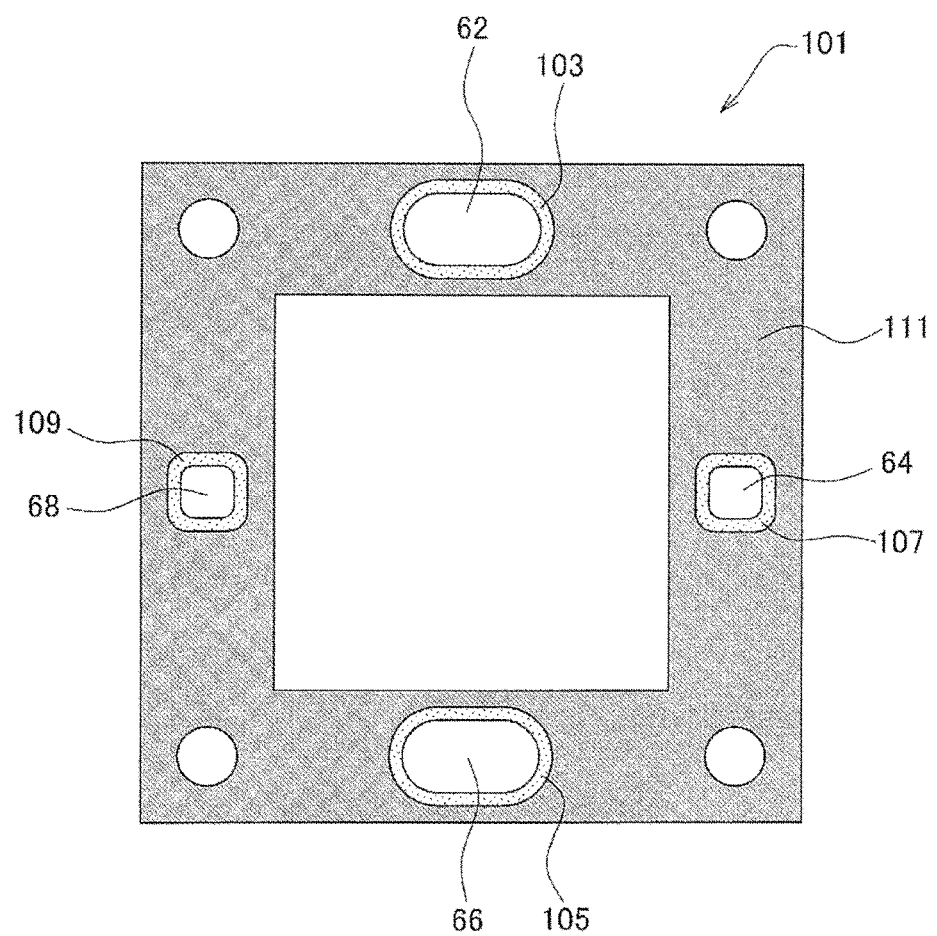
FIG. 9 Plan view showing a gas seal section in a solid oxide fuel cell stack of embodiment 2.

As shown in FIG. 9, in a gas seal section 101 of the fuel cell stack 1 of embodiment 2, annular glass seal members 103 and 105 surround the second and sixth insertion holes 62 and 66 serving as the fuel manifolds, and annular glass seal members 107 and 109 surround the fourth and eighth insertion holes 64 and 68 serving as the air manifolds.

A compression seal member 111 has a quadrangular frame shape, as in embodiment 1, and is disposed so as to surround the outer circumferences of the glass seal members 103, 105, 107, and 109.

Figure 10:
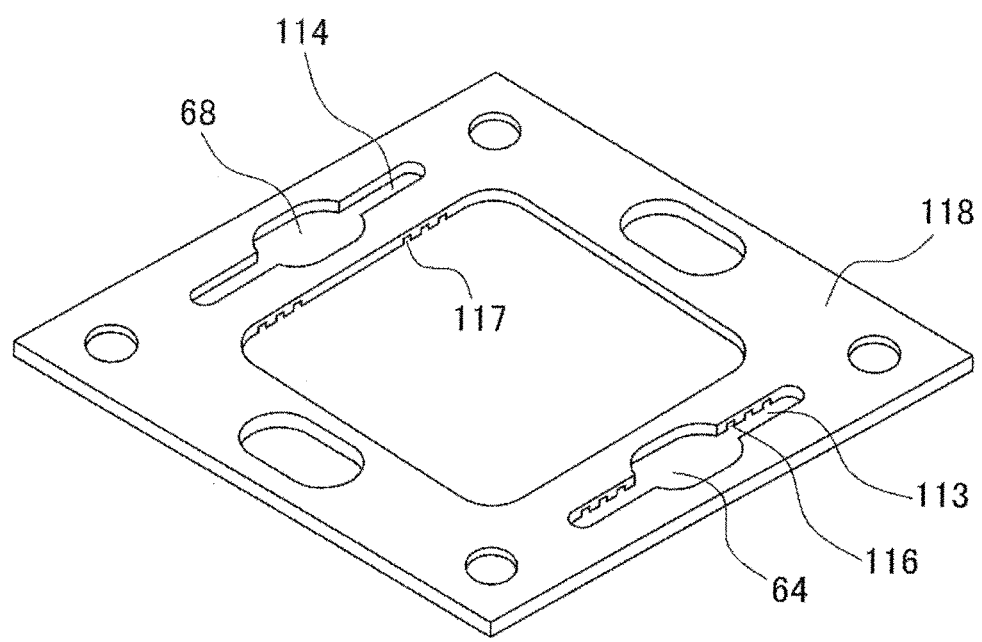
FIG. 10 Perspective view showing a cathode frame used in the solid oxide fuel cell stack of embodiment 2.

In embodiment 2, shown in FIG. 10, a cathode frame 118 that is similar to the frame-shaped anode frame 49 in embodiment 1 (the orientation of the cathode frame 118 in plan view is different by 90° from that of the anode frame 49) is disposed between a gas seal section 101 and a separator 47 (the same applies to embodiment 3).

This cathode frame 118 is a frame-shaped member having slits 113 and 114 that are through holes extending from the fourth and eighth insertion holes 64 and 68 along sides of the frame-shape; and grooves 116 and 117 extending from the slits 113 and 114 toward the cathode 39. The cathode frame 118 allows the cathode 39 and the fourth and eighth insertion holes 64 and 68 to communicate with each other through the slits 113 and 114 and the grooves 116 and 117.

In embodiment 2, the same effects as those in embodiment 1 can be obtained, and not only fuel gas leakage but also air leakage can be prevented. Therefore, the gas flow rate can be controlled with high accuracy, and this is advantageous in that the fuel cell stack 1 can be operated more accurately.

Embodiment 3

Embodiment 3 will next be described, but description of the same details as those in embodiment 1 will be omitted.

The difference between embodiment 3 and embodiment 1 is the configuration of the gas seal sections in the fuel cell stack, and therefore a description will be given of the gas seal sections. The other components are denoted by the same numerals as those in embodiment 1.

Figure 11:
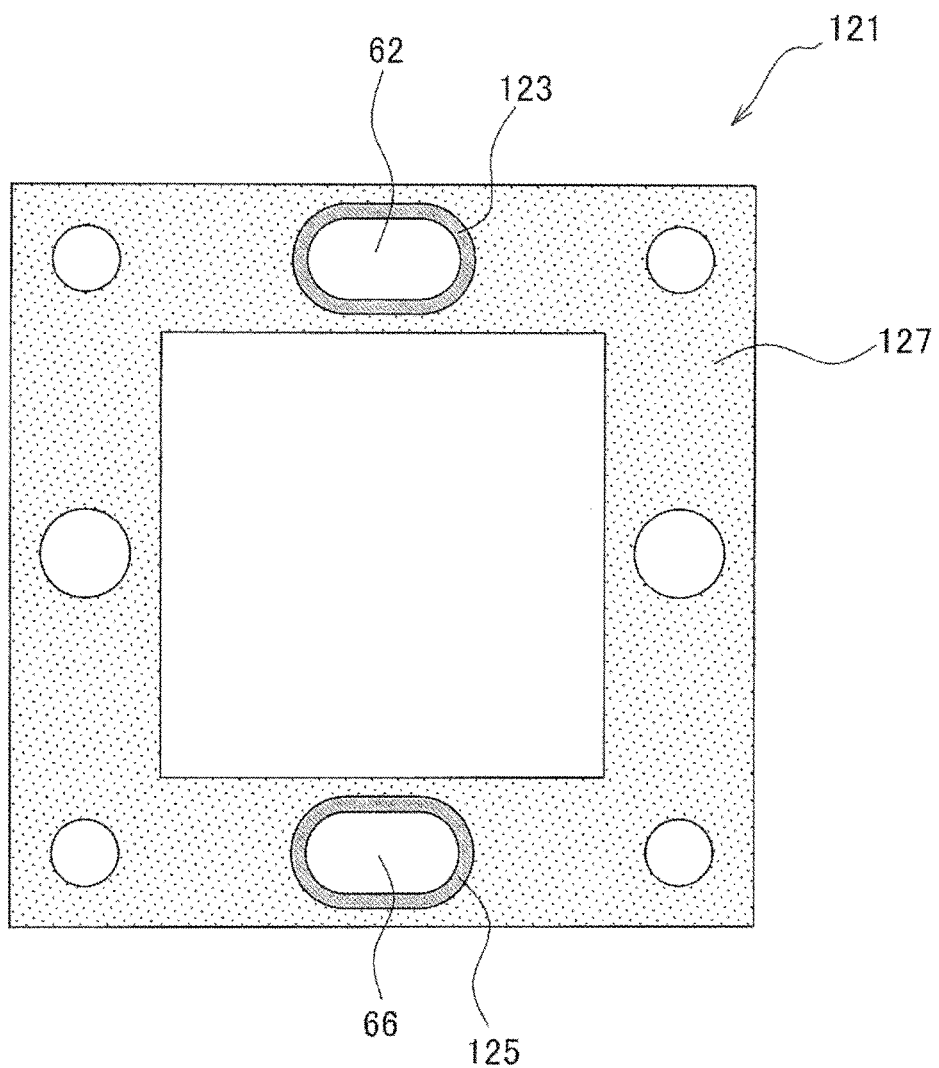
FIG. 11 Plan view showing a gas seal section in a solid oxide fuel cell stack of embodiment 3.

As shown in FIG. 11, a gas seal section 121 of the fuel cell stack 1 of embodiment 3 includes compression seal members 123 and 125 and a glass seal member 127 that are formed of the same materials as those in embodiment 1, but the arrangement of these members is a reversal of the arrangement of the corresponding members in embodiment 1.

Specifically, the annular compression seal members 123 and 125 are disposed in regions where the glass seal members are provided in embodiment 1, i.e., around the second and sixth insertion holes 62 and 66 serving as the fuel manifolds. The quadrangular frame-shaped glass seal member 127 is disposed in a region where the compression seal member is provided in embodiment 1, i.e., so as to surround the compression seal members 123 and 125.

In embodiment 3, the same effects as those in embodiment 1 can be obtained. In addition, since the area sealed with the glass is large, embodiment 3 has an advantage in that high gas sealing performance can be obtained.

Embodiment 4

Embodiment 4 will next be described, but description of the same details as those in embodiment 1 will be omitted.

The difference between embodiment 4 and embodiment 1 is the configuration of gas seal portions between the bolts and nuts of the fuel cell stack, and therefore a description will be given on the gas seal portions. The other components are denoted by the same numerals as those in embodiment 1.

Figure 12:
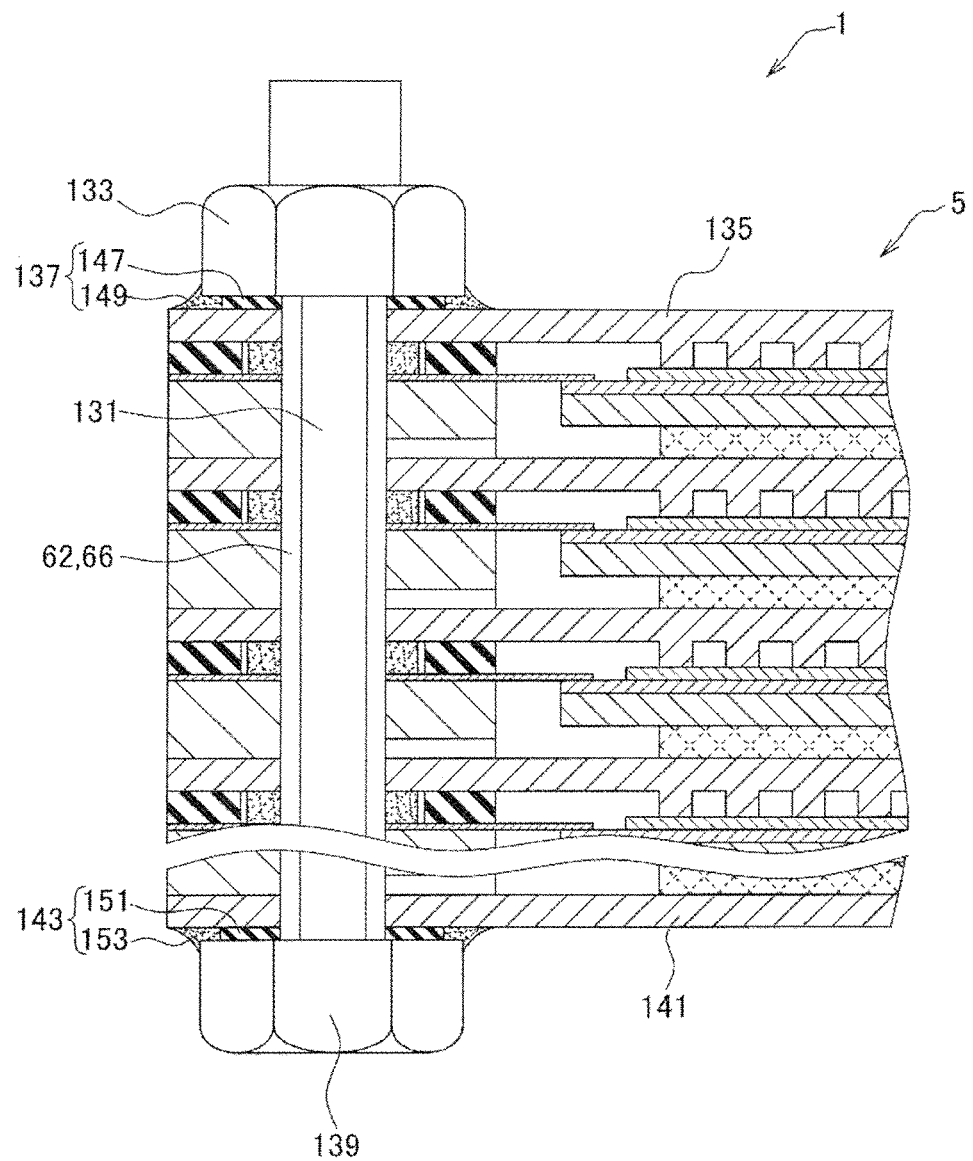
FIG. 12 Illustration showing a solid oxide fuel cell stack of embodiment 4 that is cut in its stacking direction.

(a) As shown in FIG. 12, in a fuel cell stack 1 of embodiment 4, a plurality of bolts 131 (similar to those in embodiment 1) are disposed so as to pass in the stacking direction through fuel cell stack assembly 5 having the same configuration as those in embodiment 1.

Particularly, in embodiment 4, annular first gas seal sections 137 are disposed between one end plate 135 (the upper end plate in the figure) and nuts 133 screwed onto bolts 131, and annular second gas seal sections 143 (similar to the first gas seal sections 137) are disposed between the other end plate 141 (the lower end plate in the figure) and head portions 139 of the bolts 131.

The components forming the fuel cell stack of the present invention include the bolts 131 (including the head portions 139), the nuts 133, the end plates 135 and 141, etc.

Insertion holes 62 and 66 into which the bolts 131 are inserted are fuel manifolds similar to those in embodiment 1 but may be fuel manifolds and air manifolds similar to those in embodiment 2.

Each of the first gas seal sections 137 includes an annular compression seal member 147 disposed so as to surround a bolt 131 (and an insertion hole 62 and 66); and an annular glass seal member 149 that surrounds the compression seal member 147 and is joined to a nut 133 and the end plate 135.

Similarly, each of the second gas seal sections 143 includes an annular compression seal member 151 disposed so as to surround a bolt 131 (and one of the second and sixth insertion holes 62 and 66); and an annular glass seal member 153 that surrounds the compression seal member 151 and is joined to the head portion 139 of the bolt 131 and the end plate 141. For example, the same material as that of the glass seal members 93 in embodiment 1 can be used for the glass seal members 149 and 153.

(b) The first gas seal sections 137 and the second gas seal sections 143, which are the main feature of embodiment 4, will next be described in more detail.

Figure 13:
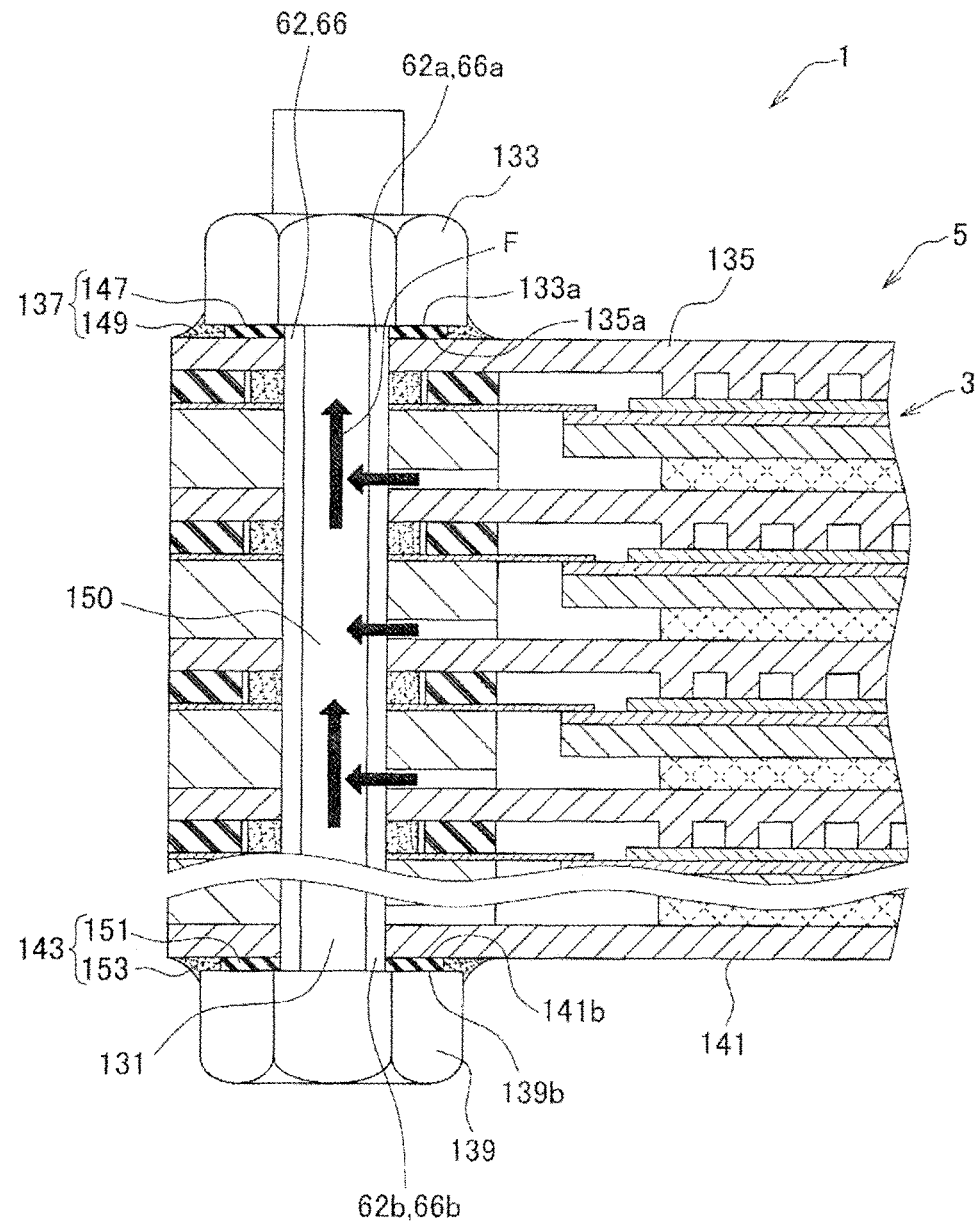
FIG. 13 Illustration showing the solid oxide fuel cell stack of embodiment 4 that is cut in the stacking direction (with fuel gas passages added).

As shown in FIG. 13, in the fuel cell stack 1 of embodiment 4, the first gas seal sections 137 are provided in order to gas-seal open ends (openings) 62a and 66a of the second and sixth insertion holes 62 and 66 (forming the fuel manifolds) located on one side thereof (the upper side in the figure), and the second gas seal sections 143 are provided in order to gas-seal open ends (openings) 62b and 66b of the second and sixth insertion holes 62 and 66 located on the other side thereof (the lower side in the figure).

Specifically, the first gas seal sections 137 are disposed so as to form gas seals between one end plate 135 on the upper side in FIG. 13 and nuts 133 (disposed at the openings 62a and 66a of the second and sixth insertion holes 62 and 66 (serving as the fuel manifolds) located on the one side thereof), i.e., between an upper surface 135a of the one end plate 135 and lower surfaces 133a of the nuts 133.

These nuts 133 are disposed so as to cover the openings 62a and 66a of the fuel manifolds located on the one side thereof (the upper side in FIG. 13), when viewed from the upper side in FIG. 13 (in plan view).

Similarly, the second gas seal sections 143 are disposed so as to form gas seals between the other end plate 141 on the lower side in FIG. 13 and the head portions 139 of the bolts 131 (disposed at the openings 62b and 66b of the second and sixth insertion holes 62 and 66 (serving as the fuel manifolds) located on the other side thereof), i.e., between a lower surface 141b of the other end plate 141 and upper surfaces 139b of the head portions 139 of the bolts 131.

The head portions 139 of the bolts 131 are disposed so as to cover the openings 62b and 66b of the fuel manifolds located on the other side thereof (on the lower side in FIG. 13), when viewed from the lower side in FIG. 13 (in plan view).

Each of the first gas seal sections 137 is composed of an annular compression seal member 147 and an annular glass seal members 149. On a common plane (as viewed in the vertical direction in FIG. 13: in plan view), the annular compression seal member 147 is disposed so as to surround shaft portion 150 of the corresponding bolt 131 (and the corresponding insertion hole 62 or 66), and the annular glass seal member 149 is disposed so as to surround the outer circumference of the compression seal member 147 (and joined to the corresponding nut 133 and the end plate 135).

Specifically, a compression seal member 147 and a glass seal member 149 are disposed around a protruding portion of a bolt 131 that protrudes (upward in FIG. 13) from the fuel cell stack assembly 5. The compression seal member 147 and the glass seal member 149 are sandwiched in the stacking direction of the fuel cells 3 (in the vertical direction in FIG. 13) between the end plate 135 and a nut 133, and are successively arranged in parallel along a plane in which the corresponding fuel cell 3 extends (a plane perpendicular to the stacking direction) such that the compression seal member 147 and the glass seal member 149 surround the protruding portion externally (from the outer side).

Figure 14:
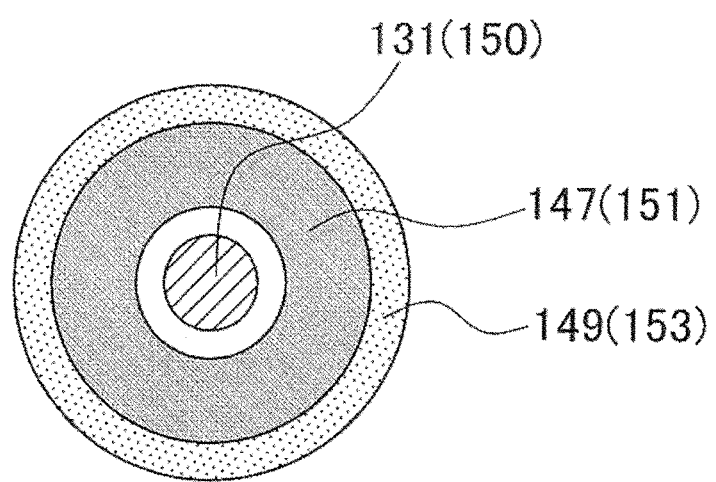
FIG. 14 Plan view showing a gas seal section around a nut in the solid oxide fuel cell stack of embodiment 4.

In other words, as shown in FIG. 14, the compression seal member 147 and the glass seal member 149 are arranged concentrically so as to surround the shaft portion 150 of the bolt 131, i.e., to surround the shaft portion 150 in radial directions perpendicular to the axial direction, as viewed in the axial direction of the bolt 131 (in plan view). Specifically, the annular compression seal member 147 is disposed on the inner side, and the annular glass seal member 149 is disposed so as to surround the entire outer circumference of the compression seal member 147.

Returning to FIG. 13, each of the second gas seal sections 143 is similarly composed of an annular compression seal member 151 and an annular glass seal member 153. On a common plane (as viewed in the vertical direction in FIG. 13: in plan view), the annular compression seal member 151 is disposed so as to surround the shaft portion 150 of the corresponding bolt 131 (and the corresponding insertion hole 62 or 66), and the annular glass seal member 153 is disposed so as to surround the outer circumference of the compression seal member 151 (and joined to the end plate 141 and the head portion 139 of the corresponding bolt 131).

Specifically, a compression seal member 151 and a glass seal member 153 are disposed around a protruding portion of a bolt 131 that protrudes (downward in FIG. 13) from the fuel cell stack assembly 5. The compression seal member 151 and the glass seal member 153 are sandwiched in the stacking direction of the fuel cells 3 between the end plate 141 and the head portion 139 of the bolt 131, and are successively arranged in parallel along a plane in which the corresponding fuel cell 3 extends such that the compression seal member 151 and the glass seal member 153 surround the protruding portion externally (from the outer side).

In other words, as shown in FIG. 14, the compression seal member 151 and the glass seal member 153 are arranged concentrically so as to surround the shaft portion 150 of the bolt 131, i.e., to surround the shaft portion 150 in radial directions perpendicular to the axial direction, as viewed in the axial direction of the bolt 131 (in plan view). Specifically, the annular compression seal member 151 is disposed on the inner side, and the annular glass seal member 153 is disposed so as to surround the entire outer circumference of the compression seal member 151.

In the first and second gas seal sections 137 and 143, the compression seal members 147 and 151 are sheet-shaped members formed of mica, as are the gas seal sections 45, and the glass seal members 149 and 153 are formed of glass. The compression seal members 147 and 151 and also the glass seal members 149 and 153 have electrical insulating properties.

Specifically, each of the compression seal members 147 and 151 is an annular ring having an outer diameter of 17 mm and an inner diameter of 11 mm. Their thickness before assembly is 0.5 mm, and the thickness after assembly (after compression) is 0.4 mm.

The glass seal members 149 and 153 are gas seal members containing glass (e.g., containing glass as a main component). In the present embodiment, as in the case of the gas seal sections 45, commercially available crystallized glass preforms (preliminary sintered compacts), for example, may be used for the glass seal members 149 and 153, and the softening point of the preforms is, for example, 770° C.

Preferably, the glass seal members 149 and 153 have a thermal expansion coefficient close to the thermal expansion coefficient of metal plates therearound (made of, for example, ferrite-based stainless steel) and have a thermal expansion coefficient of, for example, 8 to $14 \times 10^{-6}$/K (20 to 300° C.) (e.g., $11 \times 10^{-6}$/K (20 to 300° C.)). For example, G018-311 manufactured by SCHOTT can be used.

The operating temperature of the fuel cell stack 1 is, for example, 700° C. However, the temperature in the vicinities of the first and second gas seal sections 137 and 143 is about 640° C. Therefore, the glass seal members 149 and 153 used have a softening point higher than the temperature of the first and second gas seal sections 137 and 143 during operation. The material used for the glass seal members 93 of the gas seal sections 45 and the material used for the glass seal members 149 and 153 of the first and second gas seal sections 137 and 143 may be different from each other (for example, different in softening point).

It is not necessary to gas-seal other bolts 131 inserted into the first, third, fourth, fifth, seventh, and eighth insertion holes 61, 63, 64, 65, 67, and 68 through which no fuel gas flows and nuts 133 screwed onto these bolts 131. Therefore, only annular compression seal members (not shown) formed of mica and similar to those used for the first and second gas seal sections 137 and 143 are used simply as spacers.

Gas seal sections (not shown) configured similarly to the first and second gas seal sections 137 and 143 may be provided so as to gas-seal the openings of the fourth and eighth insertion holes 64 and 68 corresponding to the air manifolds in the same manner as for the fuel manifolds.

Gas seal sections (not shown) configured similarly to the first and second gas seal sections 137 and 143 may be provided so as to gas-seal the openings of all the first to eighth insertion holes 61 to 68.

When, for example, the first gas seal sections 137 in the above configuration are formed, as shown in FIG. 14, annular compression seal members 147 are disposed around bolts 131, and then annular glass seal members 149 (the glass material forming the glass seal members 149) are disposed around the compression seal members 147.

After the nuts 133 are tightened onto the bolts 131 to press and assemble the fuel cell stack 1, the glass seal members 149 and 153 are softened by heating to join them to components therearound and are then cooled.

Embodiment 4 has the same effects as embodiment 1, and a further advantage of embodiment 4 is that gas leakage from gaps between the fuel cell stack assembly 5 and the nuts 133 and between the fuel cell stack assembly 5 and the head portions 139 of the bolts 131 can be effectively prevented.

The embodiments of the present invention have been described. However, the present invention is not limited to the above embodiments and can be realized in various forms.

(1) Examples of the method of pressing the fuel cell stack assembly in the stacking direction include, in addition to the above-described method in which the fuel cell stack is tightened with the bolts and the nuts screwed onto the bolts, a method including placing a weight so as to apply a load in the stacking direction and a method including using a spring to apply pressure in the stacking direction.

(2) The bolts used may be, for example, solid bolts (with no space thereinside) or hollow bolts (with a space extending in their axial direction).

The fuel manifolds and the air manifold may not be disposed coaxially with the bolts inserted into the fuel manifolds and the air manifolds (although not illustrated). The bolts may be disposed outside the fuel manifolds and the air manifolds (although not illustrated).

(3) The present invention is not limited to the solid oxide fuel cell (SOFC) stack and is applicable to high-temperature fuel cell stacks with an operating temperature range of 600° C. or higher, such as molten carbonate fuel cell (MCFC) stacks.

The invention claimed is:

1. A fuel cell stack of a flat plate type, comprising a plurality of plate-shaped fuel cells stacked on one another in a stacking direction, each of the plate-shaped fuel cells including an electrolyte layer, an anode disposed on one surface of the electrolyte layer and in contact with fuel gas, and a cathode disposed on the other surface of the electrolyte layer and in contact with oxidant gas, the fuel cells being assembled in a state in which they are pressed in the stacking direction, the fuel cell stack being characterized in that at least one of a fuel manifold communicating with a space adjacent to the anode which is a flow passage where the fuel gas comes into contact with the anode and an oxidant manifold communicating with a space adjacent to the cathode which is a flow passage where the oxidant gas comes into contact with the cathode is provided to extend in the stacking direction;

around the at least one manifold of the fuel manifold and the oxidant manifold, the at least one manifold extending in the stacking direction, a compression seal member and a glass seal member are disposed in parallel along a plane in which the corresponding fuel cell extends such that the compression seal member and the glass seal member are sandwiched in the stacking direction between corresponding two of components of the fuel cell stack and surround the at least one manifold;

the compression seal member is disposed surrounding the entire periphery of the at least one manifold;

the glass seal member has a softening point higher than an operating temperature of the fuel cell stack;

the compression seal member is a sheet-shaped member composed of mica or vermiculite which deforms when pressed to thereby form a gas seal, wherein the compression seal member and the glass seal member are disposed between (i) one of interconnectors and (ii) one of separators, the respective interconnectors serving as a partition between adjacent two of the fuel cells, end plates being disposed at opposite ends of the fuel cell stack in the stacking direction, and the respective separators being joined to the electrolyte layer of the corresponding fuel cell and separating the space adjacent to the anode of the corresponding fuel cell and the space adjacent to the cathode of the corresponding fuel cell, wherein the separators are formed of metal, and wherein (i) the one of the separators and (ii) the one of the interconnectors are disposed between the two anodes in the adjacent two of the fuel cells.

2. A fuel cell stack according to claim 1, wherein the glass seal member has an annular shape and is disposed around the at least one manifold extending in the stacking direction, and the compression seal member is disposed around an outer circumference of the glass seal member.

3. A fuel cell stack according to claim 1, wherein the compression seal member has an annular shape and is disposed around the at least one manifold extending in the stacking direction, and the glass seal member is disposed around an outer circumference of the compression seal member.

4. A fuel cell stack according to claim 1, wherein the fuel cell stack is assembled in a state in which it is pressed in the stacking direction as a result of fastening with a bolt.

5. A method of producing a fuel cell stack according to claim 1, the method comprising:

a first step of disposing the compression seal member and a glass material that later becomes the glass seal member on a common plane such that the compression seal member and the glass material are sandwiched in the stacking direction between corresponding two of the components of the fuel cell stack and surround the at least one of the fuel manifold and the oxidant manifold, the at least one manifold extending in the stacking direction, and the compression seal member is disposed such that the entire periphery of the at least one manifold is surrounded by the compression seal member;

a second step of applying, after the first step, a pressure in the stacking direction of the fuel cell stack to press the compression seal member; and a third step of performing, after the second step, heating at a temperature equal to or higher than a softening point of the glass material and then cooling to form the glass seal member and to join the glass seal member to corresponding two of the components of the fuel cell stack.

6. A fuel cell stack according to claim 1, wherein the one of the interconnectors is disposed at an upper side of the one of the separators in the stacking direction.

* * * * *